US006430463B1

United States Patent
Lysaght (10) Patent No.: US 6,430,463 B1
(45) Date of Patent: Aug. 6, 2002

(54) TORQUE CONTROL

(75) Inventor: Richard G. Lysaght, Hicksville, OH (US)

(73) Assignee: O.E. Electronics, Inc., Bryan, OH (US)

( * ) Notice: Subject to any disclaimer, the term of this patent is extended or adjusted under 35 U.S.C. 154(b) by 0 days.

(21) Appl. No.: 09/515,712

(22) Filed: Feb. 29, 2000

(51) Int. Cl.[7] ............................................. G06F 19/00
(52) U.S. Cl. ........................ 700/168; 700/79; 318/434; 318/432
(58) Field of Search ................................ 700/168, 256, 700/261, 33; 318/434; 702/41

(56) References Cited

U.S. PATENT DOCUMENTS

| | | | | |
|---|---|---|---|---|
| 4,317,176 A | * | 2/1982 | Saar et al. ................... | 700/168 |
| 4,410,846 A | * | 10/1983 | Gerber et al. ................ | 318/490 |
| 4,562,389 A | * | 12/1985 | Jundt et al. .................. | 318/432 |
| 4,953,053 A | * | 8/1990 | Pratt ........................... | 361/31 |
| 4,965,847 A | * | 10/1990 | Jurkowski et al. ........... | 388/814 |
| 5,315,501 A | * | 5/1994 | Whitehouse .................. | 700/32 |
| 5,591,919 A | | 1/1997 | Hathaway et al. | |
| 5,689,434 A | | 11/1997 | Tambini et al. | |
| 5,903,462 A | * | 5/1999 | Wagner et al. ............... | 700/168 |
| 5,937,370 A | | 8/1999 | Lysaght | |

FOREIGN PATENT DOCUMENTS

CA             2049221       * 1/1996   ........... B66C/13/38

* cited by examiner

Primary Examiner—Thomas Black
Assistant Examiner—Crystal J Barnes
(74) Attorney, Agent, or Firm—Emch, Schaffer, Schaub & Porcello, Co., L.P.A.

(57) ABSTRACT

This torque control is a system that controls and monitors the power delivered to a tool without the use of a torque transducer. By monitoring the amount of power being delivered to the tool, a control is able to calculate the amount of torque the tool is generating. This torque system includes a controller, microprocessor, variable frequency drive (VFD) and a power tool. The control is the heart of the system. It is responsible for communicating with the VFD and tool. As the user operates the switches on the tool, the control dictates the frequency at which the VFD will run the tool. While the tool is running, the control also monitors the amount of current that the VFD is providing the tool. For every frequency that the VFD uses to stimulate the tool, the microprocessor can calculate the torque the tool is providing.

14 Claims, 6 Drawing Sheets

TORQUE CONTROL

TECHNICAL FIELD

This invention relates to a process and apparatus that controls and monitors the power delivered to a tool without the use of a torque transducer. By monitoring the amount of power being delivered to the tool, a control is able to calculate the amount of torque the tool is generating.

BACKGROUND OF THE INVENTION

Preciseness and consistency of torque are very important to mass production operations, such as automobile assembly plants. Power tool applied torque to threaded fasteners must be consistent. Industry typically incorporates the torque measuring or controlling device into the power tool. This is costly as torque transducers are very expensive. Also, this approach often has been unsatisfactory because the measurement is not direct enough. These attempts often lead to large, bulky tools.

For example, in a typical power tool, an input shaft applies torque to a spindle through a series of bevel gears on the shaft and spindle. A transducer measures the torque on the spindle through a torsionally resilient device strain gauges, a gear case, planet gears and ring gears. This circuitous path at best provides a slow response to peak torque values. Measuring torque without a transducer would provide a huge cost savings.

BRIEF SUMMARY OF THE INVENTION

This torque system includes a controller, microprocessor, variable frequency drive (VFD) and a power tool. The control is the heart of the system. It is responsible for communicating with the VFD, tool, keypad and display. As the user operates the switches on the tool, the control dictates the frequency at which the VFD will run the tool. While the tool is running, the control also monitors the amount of current that the VFD is providing the tool. For every frequency that the VFD uses to stimulate the tool, a corresponding current to torque curve exists in the control's non-volatile memory. The microprocessor through the control is able to use these current versus torque curves to select the optimal tool frequency and ultimately turn the tool off when the fastener it is driving has reached torque.

DETAILED DESCRIPTION OF THE INVENTION

This torque control provides a means of controlling a transducer-less AC tool. By monitoring the amount of power being provided to an AC tool, the control is able to calculate the amount of torque the tool is providing to the joint that is being fastened.

The variable frequency AC drive is capable of producing any frequency from 1 to 1000 Hz at any voltage less than 230 V. The drive is programmed to provide a specific voltage at any given frequency. The output of the drive is three-phase pulse width modulated (PWM) AC. A reactor is placed between the drive and the tool in order to strip the pulses and leave behind a clean AC power source.

The drive also is capable of providing feedback to the control board in the form of a voltage that represents the amount of current that is being provided to the tool. Switches are located on the tool allowing the user to tell the control how the tool is to operate. Those signals can include run, jog, reverse and brake signals.

The control is able to communicate with the variable frequency drive through digital and analog signals. The digital signals include run, acceleration mode, reverse and brake signals. The controller selects the target frequency by passing an analog voltage that represents the desired frequency to the drive.

Although an infinite amount of frequencies could be selected in this scheme, only specific frequencies are used. For each frequency the controller uses to run the tool, a curve exists in the control's memory that relates the current consumption to the torque that is generated at that power point.

A learn mode exists so that the control can run the tool at each frequency that it will use. In this mode, for example, an external torque transducer is attached to the tool and it is run with an increasing torque load until the tool stalls. The control is able to pass the torque reading, the amount of current being provided, and the frequency at which all of this is occurring to a PC program. The PC program can then manipulate these torque versus current curves and store them back in the controller's memory. Typically, this is done at the factory so that the proper curves exist in the control. The end user does not have to do this. Once these curves are in place, the user can run the control to turn the tool off at a given torque. In another mode, a PC can program the control with a torque, frequency and current reading from other established sources.

Figure 1:
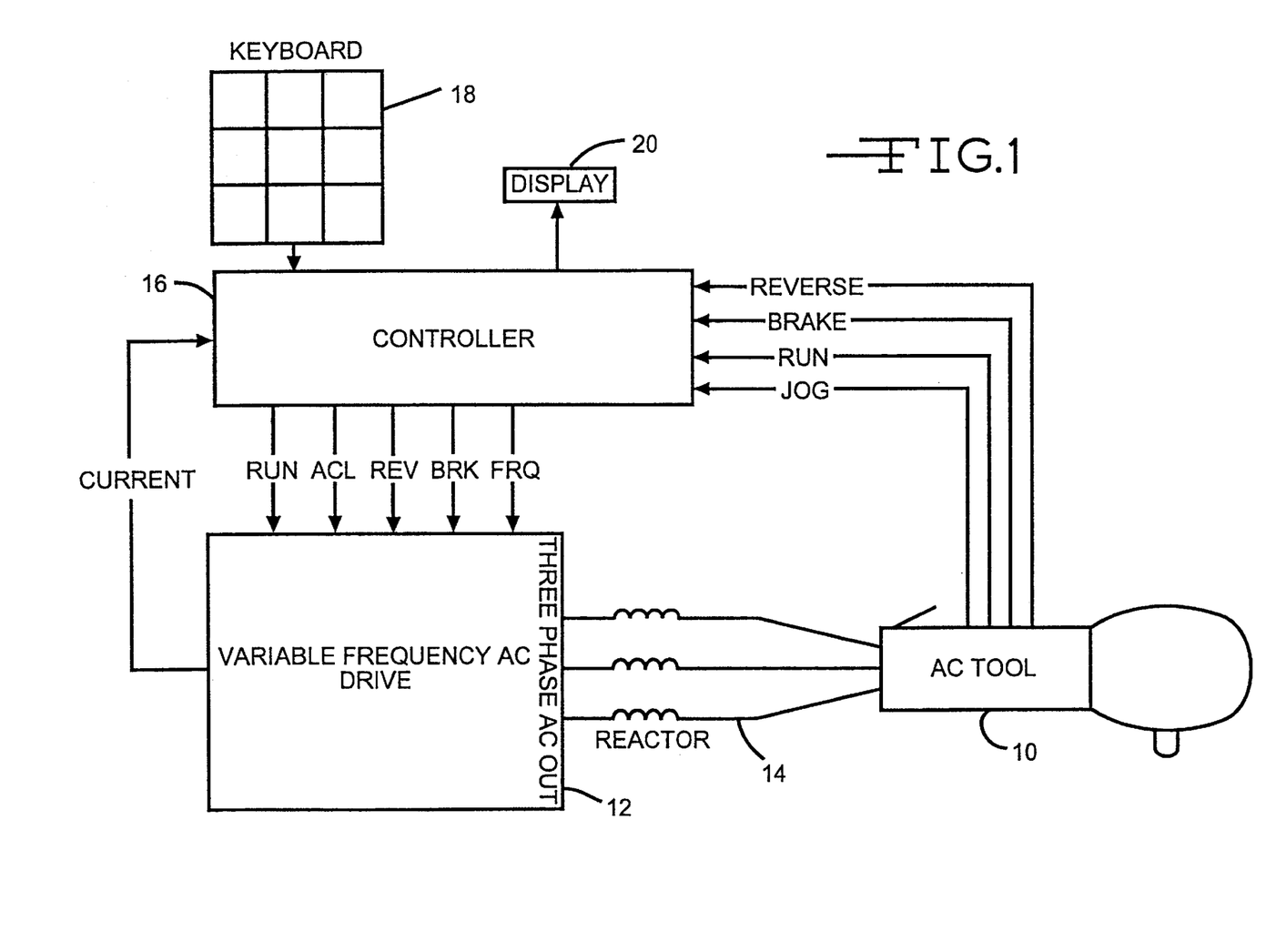
FIG. 1 is a block diagram for the torque control system of this invention.

FIG. 1 is a block diagram for controlling torque delivered by power tool 10. Variable Frequency Drive (VFD) 12 provides power to tool 10 through reactor 14. Controller 16 is connected to VFD 12 and to tool 10. Controller 16 also is connected to key pad 18 and display 20.

Figure 2:
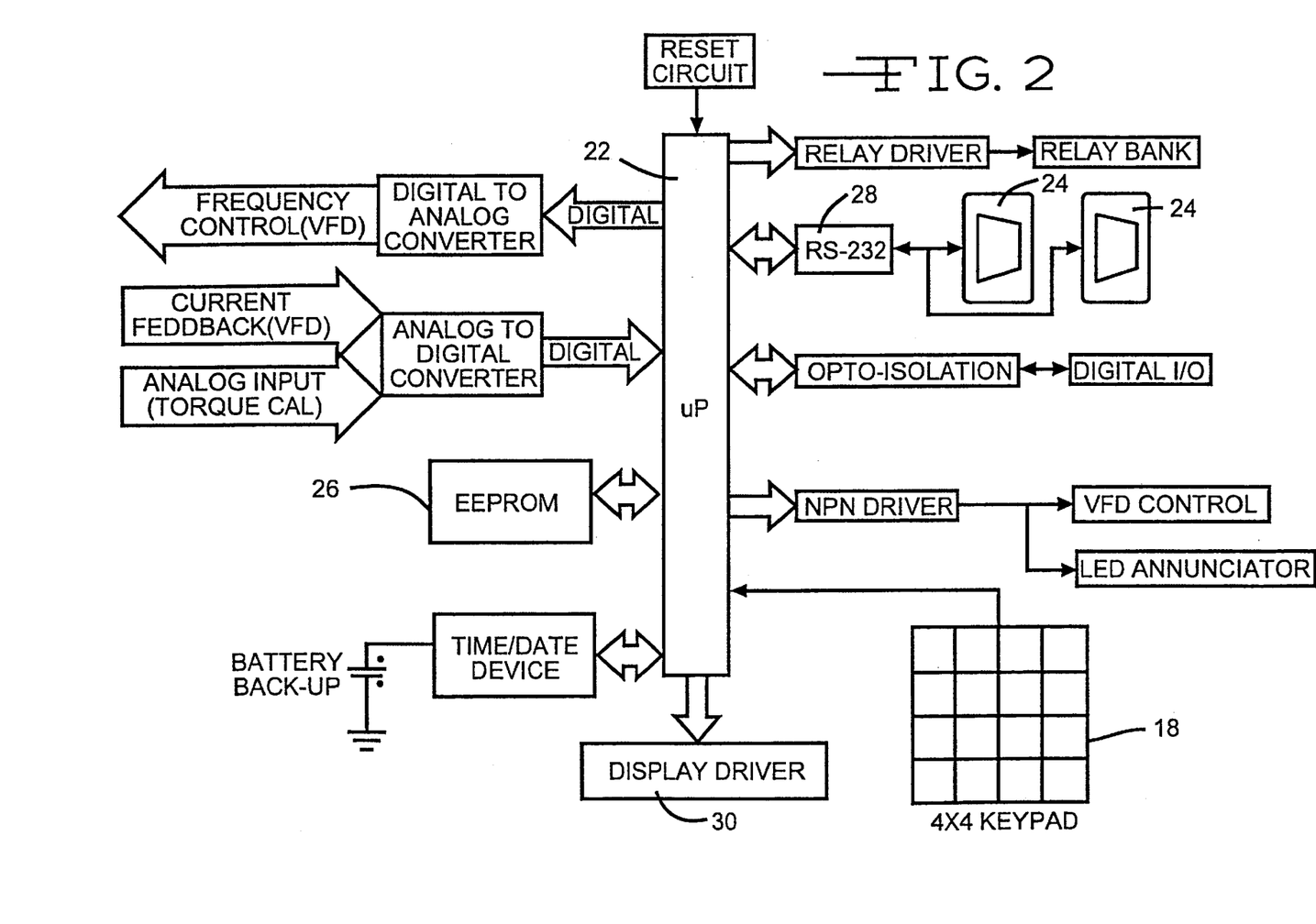
FIG. 2 is a block diagram for the torque control circuit of this invention.

FIG. 2 shows the torque control system using programmable microprocessor 22. PC 24 can download new settings into EEPROM 26 via port 28. Keypad 18 also can clear or set the settings in EEPROM 26. Display driver 30 connects to display 20.

Figure 3:
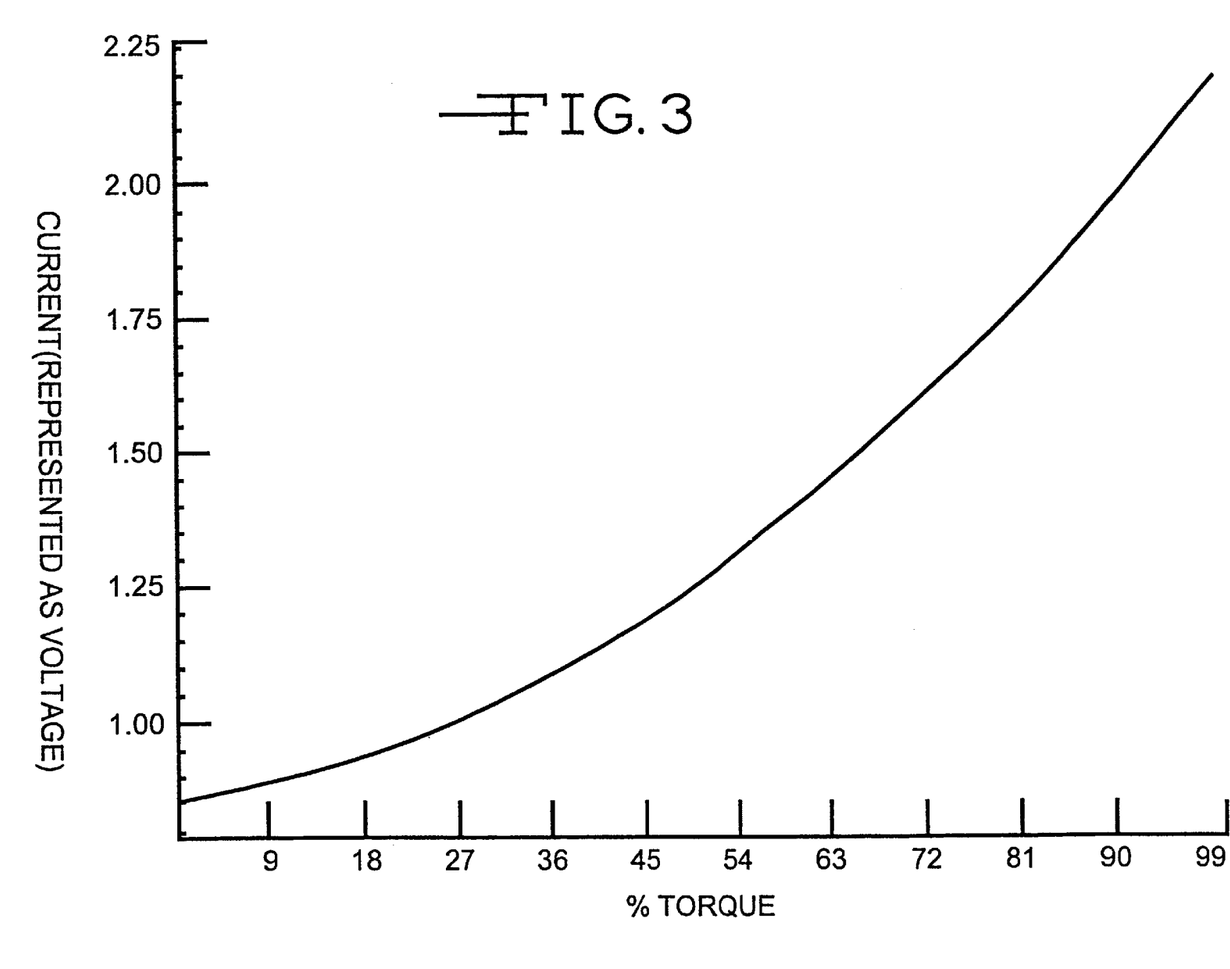
FIG. 3 is a graph of a typical torque versus power curve at lower frequencies.

FIG. 3 is a graph of a typical torque versus power curve at lower frequencies. Measurements were taken between 75 Hz and 400 Hz in 25 Hz steps.

Figure 4:
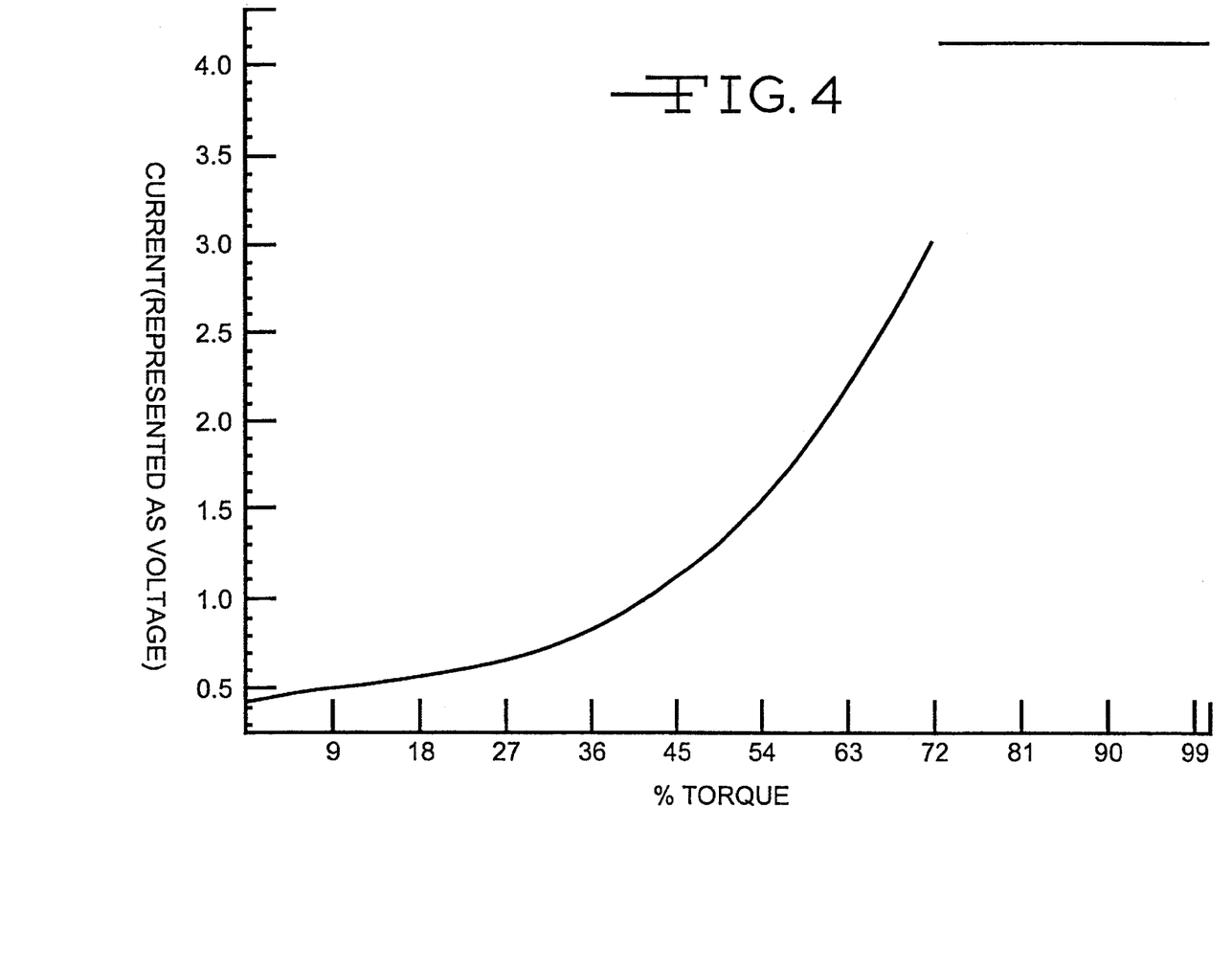
FIG. 4 is a graph of a typical torque versus power curve at higher frequencies.

FIG. 4 is a graph of a typical torque versus power curve at high frequencies. Measurements were taken between 425 Hz and 800 Hz in 25 Hz steps. The straight line in the curve merely shows that the tool has gone into the stall mode.

Figure 5:
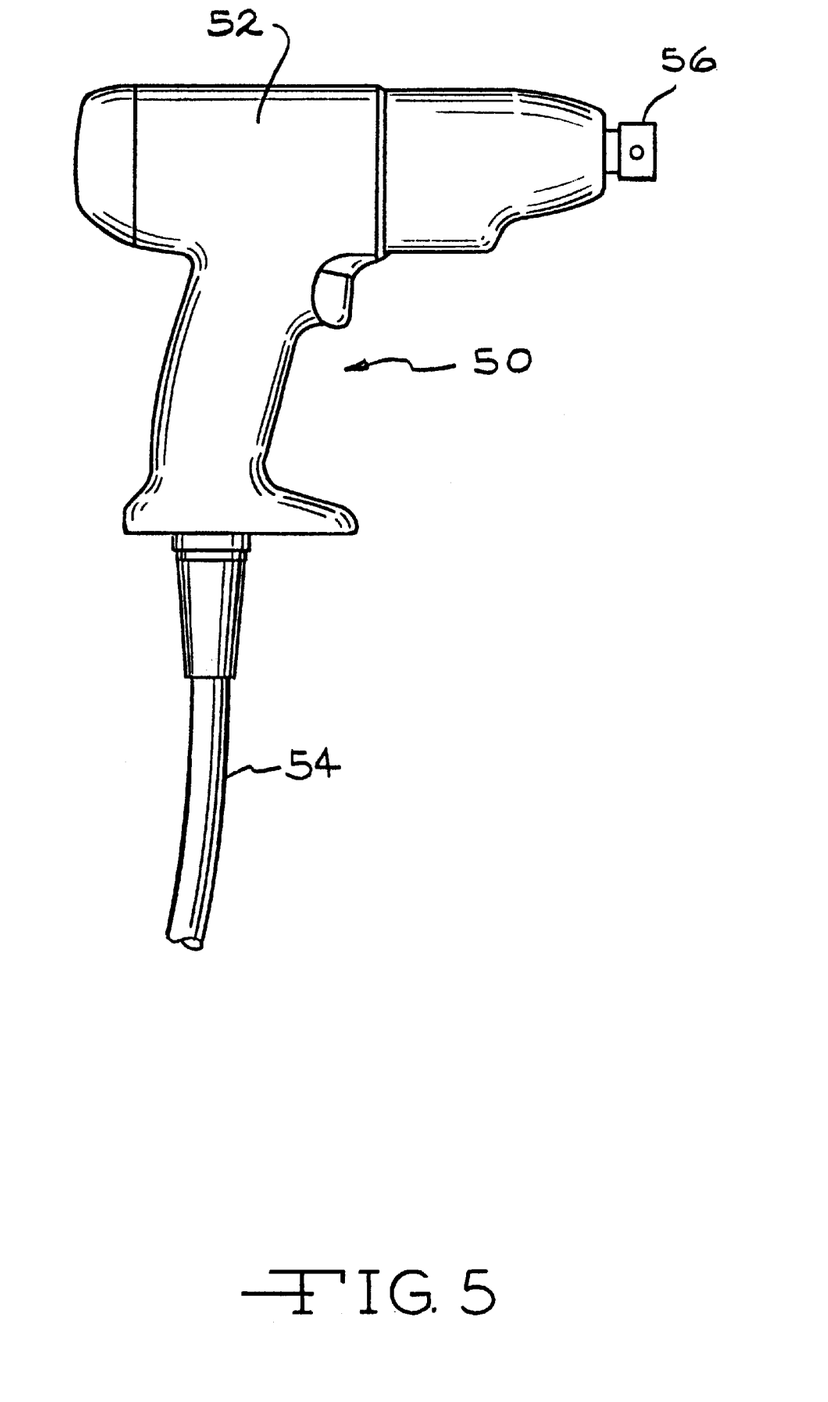
FIG. 5 is a schematic view of a conventional power driven tool.

FIG. 5 shows a conventional tool 50 which depends upon power for its operation. Tool 50 includes tool housing 52 and electric cable 54. Tool 50 also includes spindle 56. Electric cable 54 connects to drive 12. While I use AC current to illustrate my invention, other systems may be used.

Figure 6:
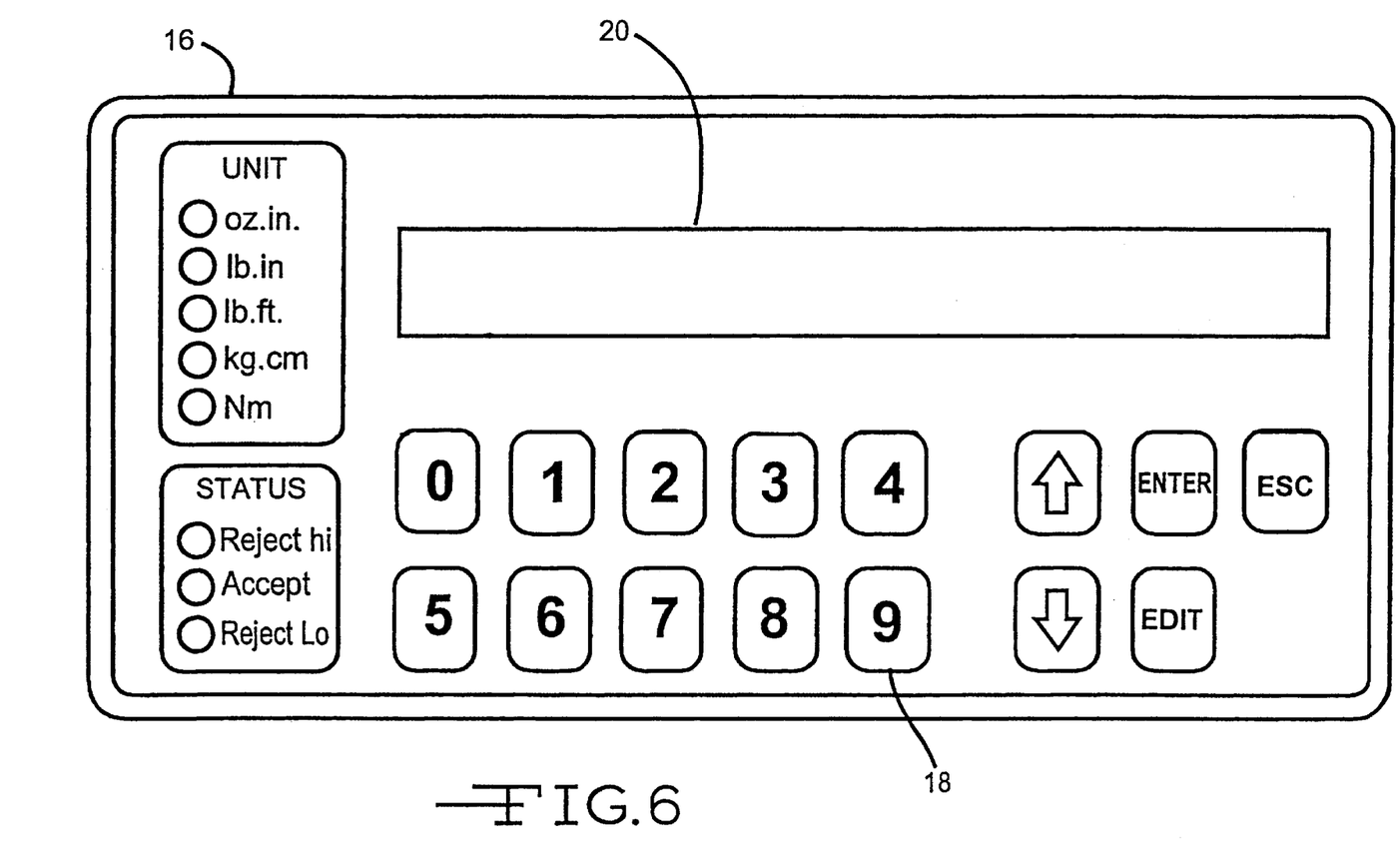
FIG. 6 is a schematic view of a face plate on the invention.

FIG. 6 is a face plate on controller 16. The face plate includes key pad 18 and display 20.

Through the use of keypad 18 and display 20, control 16 communicates with the user. The user is allowed to program the following settings into control 16 through programmable microprocessor 22.

| SETTING | DESCRIPTION |
|---|---|
| Calibration Number | Gearing factor used as a multiplier. |
| Torque Units | Preferred unit set for torque values (nm, ft*lb, in*lb, etc.). |
| Decimal Points | Number of decimal points to be displayed. |
| Time | Time of day. |
| Date | Date, including day/month/year. |
| Time Out | Amount of time tool is allowed to run in each cycle. |
| Brake Time | Period of time the DC injection brake is allowed at end of cycle. |
| Delta(l)/Delta(t) | Change in current over a change in time. |
| Dwell Time | Amount of time the control forces the VFD to remain at any given frequency. |
| Gate Time | Amount of time the unit ignores the current reading at start up and at frequency changes. |
| Drop Status | Point at which the previous runs status is dropped. Either at start up or at shift torque. |
| Target Torque | Torque to which the unit ideally runs the fastener. |
| High Torque | Torque above which a HIGH TORQUE ALARM will be generated. |
| Low Torque | Torque under which a LOW TORQUE ALARM will be generated. |
| Shift Torque | Torque at which the control will shift from run speed to mid speed. |
| Auto-Shift | Mode selection. In auto-mode the control basis the frequency selection on the DI/DT ratio. If manual, the tool speed will be limited to RUN, MID & JOG. |
| Speed Limited | Used in auto mode, can be used to limit the highest frequency the drive is allowed to reach during a run-down. |
| Run Speed | Maximum speed used beneath SHIFT TORQUE. |
| Mid Speed | Final tightening speed used beyond SHIFT TORQUE. |
| Jog Speed | Speed setting used when the tool switch is in the JOG position. |
| Reversing Speed | Speed used when the tool in run in reverse. |

All motor curves (current versus torque) are based solely on the motor alone. To put it another way, the curves are based upon the amount of current the motor draws at any given frequency/voltage for the torque output of the motor. In most tools gearing exists in front of the motor so that higher torque values may be achieved. The calibration number is a torque multiplier. When the control deduces a torque value for the motor, the calibration number is multiplied with that value in order to create the actual torque that the tool is delivering to fastener.

The control calculates all of its torque values in ounce inches and then converts to the user's preferred torque unit. Users may select to see torque values with either no, one or two decimal points.

Time and date elements can be set by the user. These values are updated and stored in non-volatile memory. At the end of each run-down and when polled by a PC, the control will produce a report. The report includes torque information, accept or reject information and the time and date of the run-down.

While the tool is running, three phase AC is generated in order to keep the tool spinning at any given frequency. Once the fastener reaches torque, the tool needs to be stopped abruptly or momentum will carry the tool and fastener beyond the target torque. In order to accomplish a timely shut-down of the tool, a DC current is injected on each of the phases. This DC current locks the tool very quickly. The brake time variable controls the amount of time that the brake is applied at the end of a fastening cycle.

The control has four modes of operation: (1) automatic; (2) fixed frequency; (3) slave; (4) accu-bake. In automatic mode, the drive switches between frequencies based upon how rapidly the current is changing. If the amount of current being drawn is increasing rapidly, the tool is slowed down. If the amount of current being drawn is constant or slowing, the tool is sped up. This continues until target torque is reached. The dl/dT variable sets the ratio of current consumption to time that the control tries to maintain in the automatic mode.

It is not advantageous to change frequencies rapidly or often. Each time the frequency changes a current hiccup occurs. The larger the shift in frequency, the larger the hiccup will be. This can be problematic since the torque control is based upon current draw. The dwell time variable is used or order force the control to stay at any one given frequency for at least the amount of time held by the dwell time variable. The gate time variable helps to combat the same current hiccup that the dwell time combats. The gate variable defines the amount of time that the control ignores the current reading after a frequency change occurs. These variables help to combat false torque readings that may occur immediately following a frequency shift if the variables are not employed.

Depending upon how the control is implemented, it may be advantageous to drop the previous runs status when the tool starts or when the tool passes through the shift torque. The drop status variable allows the end user to decide when this action will occur.

The target torque variable houses the torque value that the control will try to achieve during the fastening process. Once the target is achieved, the control stops the tool. The target torque is specified in the units that the user selected through the use of the torque units variable.

Extremely hard joints pose a problem to this control, as well as most other controls on the market. Although decreasing the tool speed will usually combat torque over shoot, the user still needs to be warned if a torque exceeds a given value. By programming a high torque, the user is able to set an alarm state. If the final torque ever exceeds the high torque value, the user is given an indication that the fastener has fallen outside the control limits. When the control is turned off prematurely and target torque is not reached it may also be desirable to report if the torque falls beneath a low torque set point. The low torque variable allows the user to choose a set point that defines this state.

The shift torque is used in both the automatic and fixed frequency modes. In fixed frequency mode the shift torque defines that torque at which the tool changes frequency from the RUN frequency to the MID frequency. During automatic control, the shift torque defines the point at which the control should start using the dl/dT variable in order to govern the frequency. Before shift torque is met, the RUN frequency is employed. After the shift torque is met, the frequency speeds up or slows down according to how rapidly the current is changing. The auto shift variable tells the control whether it will run in fixed frequency mode or automatic mode.

In order to control harder joints in automatic mode it may be advantageous for the initial frequency to be less than the maximum. If this is the case, the speed limited variable is used in order to inform the control to use the speed programmed into the RUN frequency instead of the maximum frequency.

The RUN speed variable houses a frequency that is to be implemented when the control deems that the tool should be running at a high speed. In the case of fixed frequency mode this would occur before shift torque if the tools on switch was in the run position. The control selects MID speed in fixed frequency mode once the torque passes through the shift torque. Usually MID speed is set to be lower than RUN speed so that the tool may be controlled more accurately as final torque approaches. Sometimes tools have a two position switch which allows the user to run the tool at two different speeds. When the tool's switch is in the JOG position, the JOG speed is selected. The JOG speed is usually set very, very low so that the head of the tool can be rotated slowly in order to line the tool's socket up with the head of a fastener. The REVERSING speed dictates the frequency that will be employed when the tool is run in reverse. As mentioned above, four modes of operation exist in the torque control.

Automatic mode is especially helpful with stick and slip joints. During the automatic mode, the frequency is governed by the dl/dT, dwell time and speed limited variables. As the current and torque increase, the tool slows down. If the current falls off, the tool will speed up again. This happens over and over until target torque is reached and the control turns the tool off. Joints that have a high prevailing torque, like sheet metal screws, work well in the automatic mode. Most controllers slow the tool down to a final tightening speed once the shift torque is met. In the case of a sheet metal screw the shift torque may be met and then fall off over and over as each thread cuts new metal. With the implementation of the automatic mode, the tool can speed up and slow down over and over again.

The fixed frequency mode of operation is the most accurate means of control when the VI torque unit is under its own control. While in fixed frequency mode, the control allows the tool to run at the RUN speed until shift torque is met. Once the shift torque is met, the MID speed is employed until the tool reaches target torque.

The slave mode is used when the VI torque is used in conjunction with a closed loop torque control. In this mode, the VI torque allows the closed loop control to dictate when the tool should be in RUN, MID or JOG speeds.

Accu-Brake mode was designed in order to control tools that have an internal torque switch mechanism. In Accu-Brake mode the control will make use of the shift torque in order to determine when a MID speed should be used. However, the target torque is ignored. The control waits until final torque is indicated by the internal torque switch mechanism in order to turn the tool off.

The VI torque control is constantly transmitting the values of its two analog to digital converter (A/D) channels. The current usage is measured by one of those A/D channels. A torque transducer can be connected to the other A/D channel. If a torque transducer is connected to the second channel, a personal computer (PC) can capture torque versus current information via its RS-232 or serial port. The PC can massage that information in order to create the current versus torque curves for each given frequency at which to tool is allowed to run. Armed with these curves, the PC can create look-up tables for any given tool and program them into the non-volatile memory. In doing so, the system can be configured to control a wide array of different AC tools.

In addition to these embodiments, persons skilled in the art can see than numerous modifications and changes may be made to the above invention without departing from the intended spirit and scope thereof.

I claim:

1. An apparatus for controlling torque delivered by a transducerless, power driven tool comprising:
   a power driven tool;
   a variable frequency drive (VFD) providing power to the power driven tool;
   a controller connected to the VFD that selects a target frequency for the power the VFD provides the tool, wherein the controller also monitors the power the VFD is providing the tool;
   a microprocessor connected to the controller programmed to provide a specific power at a given frequency, programmed with a power to torque curve for each given frequency, programmed to calculate the torque the tool is providing using the curve, and programmed to compare the calculated torque to a target torque; and
   means for turning off the power the VFD is providing the tool when the calculated torque reaches the target torque.

2. An apparatus according to claim 1 wherein the VFD is an AC drive.

3. An apparatus according to claim 1 wherein the VFD is capable of producing any frequency from 1 to 1000 Hz at any voltage less than 230 V.

4. An apparatus according to claim 1 wherein the VFD is programmed to provide a specific voltage at any given frequency.

5. An apparatus according to claim 1 wherein the VFD has a power output of three-phase pulse width modulated (PWM) current.

6. An apparatus according to claim 5 including a reactor placed between the VFD and the tool to strip the pulses and leave behind a clean power source.

7. An apparatus according to claim 5 including means to inject DC current into the phased current to shut the tool off when the calculated torque reaches the target torque.

8. An apparatus according to claim 1 wherein the tool includes a means to run the tool at a run, mid, jog, reverse and break settings.

9. An apparatus according to claim 8 including means to inject DC current into the power the VFD provides the tool when the tool and microprocessor are in the break setting.

10. An apparatus according to claim 8 wherein the microprocessor is programmed to run the tool at a given speed for each of the settings.

11. A process for controlling torque delivered by a transducerless, power driven tool comprising the steps of:
    providing a power driven tool;
    powering the power driven tool with a variable frequency drive (VFD);
    selecting a target frequency for the power the VFD provides the tool with a controller;
    monitoring the power the VFD provides the tool with the controller;
    sending signals to the controller with a microprocessor;
    programming the microprocessor with a target torque for the tool;
    calculating the torque the tool is providing; and
    turning off the power the VFD is providing the tool when the calculated torque reaches the target torque.

12. A process according to claim 11 including the steps of:
    programming the microprocessor to provide a specific voltage at a given frequency; and
    programming the microprocessor with a power to torque curve for each given frequency.

13. A process according to claim 12 including the steps of:
comparing the monitored power to the programmed power; and
comparing the monitored power to the power to torque curve.

14. A process according to claim 13 wherein the tool has a speed and the monitored power controls the speed of the tool.

* * * * *